June 10, 1969
C. A. PEERMAN
3,448,759
WATER SYSTEM FOR HIGH RISE BUILDINGS
Filed July 6, 1966
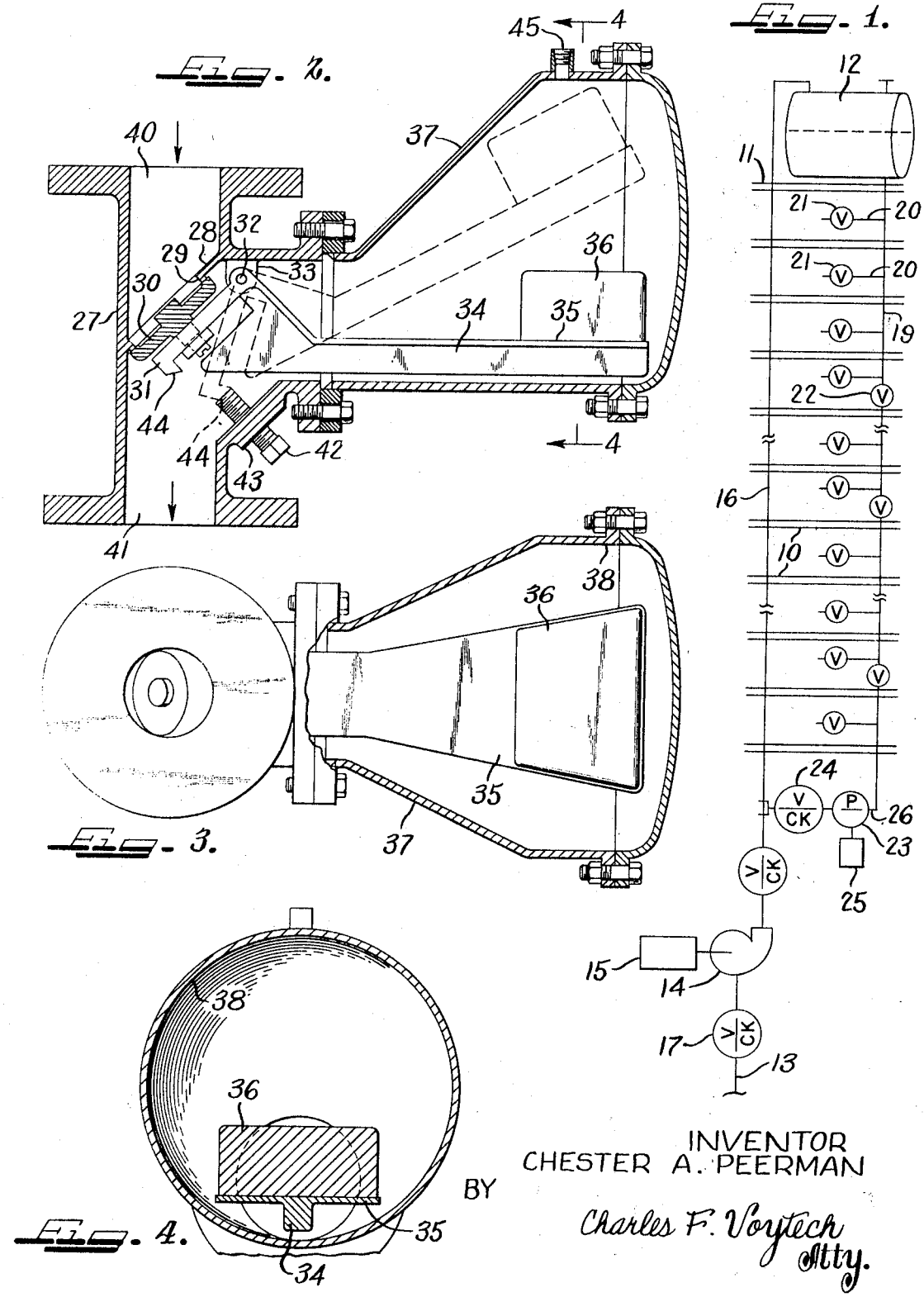
INVENTOR
CHESTER A. PEERMAN
BY Charles F. Vojtech
Atty.

United States Patent Office 3,448,759
Patented June 10, 1969

3,448,759
WATER SYSTEM FOR HIGH RISE BUILDINGS
Chester A. Peerman, 5435 Washington St.,
Morton Grove, Ill. 60053
Filed July 6, 1966, Ser. No. 563,283
Int. Cl. E03b 7/00; F16k 21/04
U.S. Cl. 137—357                              5 Claims

ABSTRACT OF THE DISCLOSURE

This invention relates to a water supply system for a high rise building and more specifically to means for counteracting or modifying the effects of gravity upon the water pressure in the vertical and lateral distribution piping.

---

This invention relates to a water supply system for high rise buildings.

Multi-storied buildings, whether of the office or apartment type, must provide water under adequate pressure for the use of the occupants. The water systems commonly in use in these buildings comprise a pump at or near ground level which draws water from a city water main and forces it upward through an appropriate riser to a supply tank or the like located at the top of the building. Check valves are used to prevent back-up of water from the system to the water main. The water is stored in the roof tank at atmospheric pressure or delivered to the system similarly and conducted downward through vertical distribution piping to each floor where it passes through lateral pipes to the faucets, flush valves, etc., located on the respective floors.

The foregoing systems have no provision for counteracting or modifying the effects of gravity upon the water pressure in the vertical and lateral distribution piping, and as a consequence, the water pressure at each floor below the roof supply increases with the vertical distance from the roof supply. Thus, although the water pressure at the upper three stories may be of the desired value. it increases at each floor below these floors and rapidly becomes excessive. The system then requires special metallurgy in high pressure valves and seats to prevent rapid wear, erosion channeling, wire drawing, and destruction of the valve parts. The cost of supplying, maintaining and replacing valves and parts rendered useless by excessively high pressures is very great and burdensome to the owner of the building. Noise at the points of use is also objectionable.

The principal object of this invention is the provision of a water supply system for a high rise building, which prevents an undue increase in pressure in the system due to the effects of gravity upon the water in the system.

As a more specific object, this invention seeks to provide a water system for a high rise building having a water supply at the top of the building and vertical distribution piping extending downwardly therefrom through the building, with means at predetermined levels for reducing the pressure caused by gravity in the vertical supply piping at each such level, or group of floors.

As a still more specific object, this invention has within its purview the provision in a water supply system for a high rise building having a downflow source of supply at the top thereof with vertical distribution or downfeed piping extending downwardly through the building from said source, of valves at predetermined levels in the downfeed piping which prevent substantial flow therethrough until a pressure drop of predetermined value is created thereacross, said valves being of the weight- or spring-actuated loaded back pressure type.

Yet another specific object of this invention is the provision of back-pressure valves arranged in series in a downfeed pipe to prevent the accumulation of a gravity head in the pipe which exceeds a predetermined value.

These and other objects of this invention will become apparent from the following detailed description of a preferred embodiment thereof when taken together with the accompanying drawings in which FIG. 1 is a diagrammatic representation of a high rise building in which the system of this invention is installed;

FIG. 2 is a side elevation in section of a typical back pressure valve used in the system of FIG. 1;

FIG. 3 is a plan view of the check valve of FIG. 2; and

FIG. 4 is an end elevation in section of the valve of FIG. 1 taken along line 4—4 thereof and looking in the direction of the arrows at the ends of said line.

Referring now to FIG. 1, the system of this invention is shown schematically as applied to a high rise building having a plurality of floors 10 one above the other and a roof 11 on which is located a tank 12, or other water supply source. Said tank 12 is a supply tank for water under atmospheric pressure which is to be supplied to the occupants of the building at approximately the standard pressure used in the municipality in which the building is located.

Water is pumped into tank 12 from an underground municipal water main 13, or other source, by a pump 14 driven by a suitable motor 15, the outlet for pump 14 being connected to a riser 16 which conducts the water to the top of the building and into tank 12. A check valve 17 prevents water from pump 14 from backing into main 13, and a check valve 18 prevents reverse flow of water out of tank 12 and into pump 14 when said pump is not operating. It is contemplated that motor 15 will be controlled by a switch (not shown) sensitive to the pressure of the water in tank 12 at some selected level so that motor 15 will operate when the pressure at that level falls below a predetermined value. Such pressure-switch operated pumps are well known in the art and hence need not be shown and described in detail herein.

From tank 12, the water is conducted downward by gravity through vertical distribution piping 19 to branch lines 20 on each of the floors 10 and thence to one or more valves or faucets shown diagrammatically at 21. Obviously, the gravity head developed in supply piping 19 and branch line 20 increases as the vertical distance between the water level in tank 12 and the particular valve 21. In a thirty story building, for example, with a height of nine feet per floor, the roof would be 279 feet above the street level and the gravity head at the street would be 121 pounds per square inch, which obviously is extremely excessive for valves designed for 30–60 pounds per square inch pressure.

The means by which the pressure on all valves 21 in a high rise building is kept within moderate limits according to this invention, will now be described. In general, the means comprises pressure differential operated back pressure valves interposed in the vertical supply piping 19 at intervals to divide said piping into short sections, each of which is independent hydraulically of the adjacent section except when the pressure in a section drops due to the opening of a faucet or valve 21 in that section. The height of each section is selected to result in a gravity head in the lowest floor of a section which does not exceed a desirable predetermined unit pressure in the faucet or valve located on said floor. Thus a pressure-differential opearted back-pressure valve 22 may be inserted at every fourth floor level in the building, so that the gravity head throughout the building does not exceed that of a four-story building, regardless of the total number of floors in the building.

It is difficult to design back-pressure valves in a manner to make them close without slight leakage, unless they are made with extreme precision. Such precision is costly and hence impractical. In the system of this invention the leakage past back-pressure valve, unless provided for, would eventually result in the establishment of a continuous column of water substantially equal to the height of the vertical distribution piping and thereby defeat the purpose of the system. According to this invention, therefore, means are provided for removing the water which may leak past the back-pressure valves, and thus prevent the establishment of the continuous column of water. This means is comprised of a positive displacement pump 23, preferably of the gear type, which is inserted in the lower end 26 of the vertical distribution piping 19 and serves to pump water from said lower end through a check valve 24 to riser 16. Said pump 23 may be driven by a motor 25 which is controlled by the pressure of the water in the lower end 26 of the distribution piping 19, so that motor 25 will not operate until the pressure in said lower end 26 exceeds a predetermined value which may be the maximum to be allowed for a section. Such pressure controls, as stated above, are common and hence will not be described in detail herein.

It may be apparent that the unit pressure is riser 16 at the level of check valve 24 will be considerably higher than the unit pressure in lower end 26 of distribution piping 19 and that the function of check valve 24 is to prevent water from riser 16 from entering distribution piping 19.

Several forms of pressure differential operated back-pressure valves are available for use in distribution piping 19. I prefer, however, the particular form shown in FIGS. 2, 3 and 4. In this form, a flanged modified T is inserted in piping 19, said T forming the body of the valve and being provided with an inclined partition 28 having a flanged opening 29 therein forming a valve seat. A valve disc 30 is secured to a plate 31 which is pivoted at 32 to a boss 33 formed in valve body 10. Formed integrally with plate 31 is an arm 34 which is T-shaped in cross-section and which is tapered toward its right-hand end as viewed in FIG. 2 to form a platform 35 to which is appropriately secured by welding, fasteners, or the like, a weight 36. A standard flange offset reducer is secured to the T and forms a housing 37 for arm 34, said reducer having a circular opening 38 providing access to the interior of the valve. A standard cover 39 is bolted over opening 38.

The water in the vertical distribution piping 19 enters upper chamber 40 and acts upon valve disc 30 through opening 29 to tend to rotate disc 30 counterclockwise as viewed in FIG. 2 about pivot 32 and move disc 30 off its valve seat to allow the water to pass downward into the lower chamber 41 of the valve. The counterclockwise movement is resisted by arm 34 and weight 36 supported thereon, and by the upward pressure on disc 30 exerted by the water in lower chamber 41. The weight 36 and arm 34 are not sufficiently large by themselves to resist completely the pressure of the water in upper chamber 30 and hence enough water will pass through opening 29 into lower chamber 41 to build up a back-pressure upon disc 30. Thus, if the total pressure exerted on disc 30 by the water in upper chamber 40 is greater than the sum of the total pressures exerted upon disc 30 by arm 34, weight 36 and the water in lower chamber 41, the disc 30 will be moved off its seat and water will pass through the valve from chamber 40 to chamber 41, but if the reverse is true, the disc will be held on its seat and there will be no flow through the valve.

It may be appreciated that since back pressure valves 22 are located vertically at positions in which the maximum gravity head is determined to be within desired limits, and since the pressures exterted on disc 30 by arm 34 and weight 36 are fixed, the controlling variable will be the presure in lower chamber 41. This pressure, in turn, is dependent upon whether faucets or valves 21, in the section below valve 22, are open, and to what extent. Whenever a faucet in the adjacent downstream section is opened, the pressure in chamber 41 drops, and when an unbalanced condition across disc 30 is created, the disc moves off its seat and water flows through the valve. This, of course, lowers the pressure in the next higher section to open the next higher valve 22, and so on to the top section. At the top, a relatively constant head is maintained by tank 12, which, as stated above, is maintained at a predetermined level by pump 14.

Housing 37 for arm 34 is filled with water, and arm 34, being tapered and quite broad, functions as a vane to dampen the movement of arm 34 and its connected valve disc 30 to eliminate valve chatter. The movement of arm 34 in an opening direction is limited by an adjustable stop in the form of a screw 42 threaded into a boss 43 formed in valve body 27 which is contacted by a boss 44 formed on plate 31. A vent plug 45 at the top of housing 37 facilitates ridding housing 37 of entrained air which, if present, would detract from the dash-pot action of arm 34. Plug 45 also facilitates the entry of air to displace water drained from the valve when said valve is to be opened and inspected or repaired.

The foregoing water supply system limits to a reasonable value the maximum gravity head which may be developed against faucets and valves 21 in a high rise building and hence makes possible the use of standard valves, faucets and fittings throughout the building. This desirable objective is achieved by the use of back pressure valves arranged in series to impress a fixed differential in pressure at or through each such valve regardless of the pressure involved in the system or of the downstream pressure. In contrast, a pressure reducing valve produces a set downstream pressure by employing a required differential of pressure through the valve. Such required differential of pressure is not desirable in a water supply system since it is only required to furnish water at sufficient pressure to satisfy normal water users. A pressure relief valve, on the other hand, limits the upstream pressure to a fixed value, usually by venting the excess pressure to atmosphere or to a low pressure part of the system. In both the pressure-reducing valve and the relief valve, piping is required at each valve to carry off the vented water which increases the cost of the system and produces noise at each valve. The system of this invention requires no vent piping and automatically adjusts itself to the predetermined pressure differential regardless of the quantity of water flowing therethrough.

I claim:

1. A water system for high rise buildings comprising a distribution pipe connecting outlet valves on a plurality of floors at different levels, means for supplying said pipe with water from a point above the highest floor in the building, and means in said pipe for limiting the accumulation of the gravity head of the water therein, said means comprising a valve interposed in said pipe, said valve having a movable element adapted to move between open and closed positions to respectively allow or stop flow of water through said valve, and means acting upon said valve element to establish a predetermined fixed pressure differential across said valve element to move said valve element toward closed position, said valve element being continuously acted upon by the pressure of the water on the upstream side of said valve in an opening direction, and said fixed pressure differential being normally less than the pressure of the water on the upstream side of said valve, said high rise building containing a plurality of distribution valves at varying levels connected into said downfeed distribution piping and there being a plurality of said means for limiting the accumulation of the gravity head in series in said distribution pipe.

2. A water system as described in claim 1, said valve element comprising a valve disc having a surface exposed to the water on the upstream side of said valve, and said means acting upon said valve to establish a predetermined fixed pressure differential comprising a substantially flat arm, means securing one end of said arm to the movable valve element, a weight on the other end of said arm, said valve having further a fixed housing, and a pivot on the housing for the arm disposed with its axis in the plane of the substantially flat arm, said weight acting upon said arm to cause said arm to urge the valve element to its closed position.

3. A water system as described in claim 2, said housing enclosing said weight and said arm and being substantially filled with water from the downstream side of said valve such that movement of said arm and weight is dampened by said water.

4. A water system as described in claim 1, wherein said means for supplying said pipe with water comprises a source of water substantially at ground level, a tank at said point above the highest floor, a riser connecting the source to said tank, a pump for forcing water through said riser from said source to said tank, and a check valve in the riser for preventing flow of water in the riser from the tank to the pump; and means for removing water from the lowest point in the distribution pipe and returning it to the riser.

5. A water system as described in claim 1, wherein a plurality of said valves is inserted in series in the distribution pipe, and means for establishing a predetermined maximum hydraulic back pressure on the valve element of the lowermost valve in the series tending to move said element in a closing direction.

References Cited

UNITED STATES PATENTS

| | | | |
|---|---|---|---|
| 902,898 | 11/1908 | Newhall | 52—27 |
| 3,183,525 | 5/1965 | O'Brien et al. | 4—10 XR |
| 3,239,849 | 3/1966 | Liljendahl | 4—10 XR |
| 1,135,410 | 4/1915 | Smith | 137—357 XR |
| 1,440,558 | 1/1923 | Scribner et al. | 137—527.8 XR |
| 1,442,516 | 1/1923 | Blake | 137—527.8 XR |
| 1,720,444 | 7/1929 | Rowley | 137—527.8 |
| 1,725,428 | 8/1929 | Tilden | 137—527.8 |
| 2,654,388 | 10/1953 | Glass | 137—527.8 XR |
| 2,706,488 | 4/1955 | Harrington | 137—527.8 XR |
| 2,892,464 | 6/1959 | Glass | 137—527.8 XR |
| 2,969,492 | 1/1961 | Wheatley | 137—527.8 XR |
| 3,062,232 | 11/1962 | McGay | 137—527.8 XR |
| 3,074,429 | 1/1963 | Farrow | 137—527.8 |

FOREIGN PATENTS 158,675  2/1921  Great Britain.

SAMUEL SCOTT, *Primary Examiner.*

U.S. Cl. X.R.

137—527.8